United States Patent
Lu et al.

(10) Patent No.: US 9,158,905 B2
(45) Date of Patent: Oct. 13, 2015

(54) METHOD FOR COMPUTER STARTUP PROTECTION AND SYSTEM THEREOF

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 909 days.

(21) Appl. No.: 12/565,125

(22) Filed: Sep. 23, 2009

(65) Prior Publication Data

US 2010/0082966 A1 Apr. 1, 2010

(30) Foreign Application Priority Data

Sep. 28, 2008 (CN) .......................... 2008 1 0223249
Sep. 28, 2008 (CN) .......................... 2008 1 0223250
Sep. 28, 2008 (CN) .......................... 2008 1 0223387

(51) Int. Cl.
G06F 21/00 (2013.01)
G06F 21/34 (2013.01)
G06F 21/57 (2013.01)

(52) U.S. Cl.
CPC .............. G06F 21/34 (2013.01); G06F 21/575 (2013.01)

(58) Field of Classification Search
CPC ..... G06F 21/575; G06F 21/31; G06F 9/4406; G06F 21/78; G06F 21/34
USPC ......................................... 726/16, 18; 713/2
See application file for complete search history.

(56) References Cited

U.S. PATENT DOCUMENTS

| | | | | |
|---|---|---|---|---|
| 4,907,268 A * | 3/1990 | Bosen et al. | .................. | 713/193 |
| 5,060,263 A * | 10/1991 | Bosen et al. | .................. | 713/184 |
| 5,432,851 A * | 7/1995 | Scheidt et al. | ................ | 713/184 |
| 5,481,611 A * | 1/1996 | Owens et al. | ................. | 713/159 |
| 5,828,831 A * | 10/1998 | Kong | ................ | 726/18 |
| 5,887,131 A * | 3/1999 | Angelo | ........................... | 726/20 |
| 5,937,068 A * | 8/1999 | Audebert | ....................... | 713/185 |
| 7,111,321 B1 * | 9/2006 | Watts et al. | ....................... | 726/2 |
| 2003/0105964 A1 * | 6/2003 | Brainard et al. | ............. | 713/178 |
| 2003/0191960 A1 | 10/2003 | Hung-yi | | |
| 2007/0250923 A1 * | 10/2007 | M'Raihi | ......................... | 726/18 |
| 2009/0287837 A1 * | 11/2009 | Felsher | ......................... | 709/229 |

* cited by examiner

*Primary Examiner* — Syed Zaidi
(74) *Attorney, Agent, or Firm* — Hammer & Associates, P.C.

(57) ABSTRACT

A method for computer startup protection, wherein the method includes steps that a computer powers up, and loads and executes a dynamic password computer startup protection program; the dynamic password computer startup protection program receives a password entered by a user; the password is obtained by the user via sending a dynamic password generating command to a dynamic password device; then the dynamic password computer startup protection program determines whether the password is valid, if so, the dynamic password computer startup protection program loads a computer startup program of the computer; otherwise the dynamic password computer startup protection program does not load the computer startup program of the computer. A system includes a computer and a dynamic password generating device.

15 Claims, 6 Drawing Sheets

METHOD FOR COMPUTER STARTUP PROTECTION AND SYSTEM THEREOF

FIELD OF THE INVENTION

The present invention relates to the field of information security, and more particularly, to a method for computer startup protection and a system thereof.

BACKGROUND OF THE INVENTION

In the computer application field, during a process of protecting computer startup or accessing a remote server by a client side, for example, when a user starts a computer in normal mode, the general method for computer startup protection requires the user to enter a password to determine whether the identity of the user is legitimate. If the user can enter a correct password, the user will be regarded as a legitimate user by the computer (or the remote server) and is permitted to login and access the computer. Generally, the password of the user is set up by the user himself/herself. Theoretically, the user is the only one who knows the password. Therefore, the computer regards the user as legitimate if the user enters the password correctly.

And the computer can only identify the digital identity of the user; all the authentications to the user are for the digital identity of the user. While the real world is physical, every one has a unique physical identity. How to guarantee the user who would operate the computer with a digital identity is the legitimate owner of the digital identity, or how to guarantee the physical identity of the operator accord with the digital identity, is an important problem.

In the process of implementing the invention, the inventor found problems below.

On one side, in the method described above with the mode of user name/password, most user uses his/her or family member's birthday date or a telephone number as the password to prevent the password from being forgotten. But those meaningful character strings are easily to be guessed by others; or the user writes the password on a place where the user thought is safe, which is unsafe actually and the password is disclosed easily; furthermore, when the illegitimate user login the computer with the obtained password, the illegitimate user can transplant hard disk into a computer without a password and replace the content of the hard disk to implement the normal starting of the system. Therefore, the mode of user name/password above for identity identification has potential security threats.

On the other side, the mode of user name/password above is a verification mode of static password. During the application process, verification mode of static password has a lot of unsafe factors, which will lead to password disclosure and illegitimate login. Therefore, verification mode of static password is a way of identity verification with potential security threats.

In a word, in the prior art, the protection for computer startup has potential security threats which leads to password disclosure easily; and the security of binding the physical identity and digital identity cannot be guaranteed.

SUMMARY OF THE INVENTION

The object of the present invention is to provide a method for computer startup protection and a system thereof, which can enhance the security and reliability in the process of the computer startup and can be easily and widely used.

According to the first aspect of the present invention, there is provided a method for computer startup protection includes: powering up a computer; loading and executing, by the computer, a dynamic password computer startup protection program; receiving, by the dynamic password computer startup protection program, a password entered by a user; in which the password is obtained by the user via sending a dynamic password generating command to a dynamic password generating device; when the dynamic password generating device receives the dynamic password generating command from the user, the dynamic password generating device generates the password according to a password generating factor and a password generating algorithm; and determining, by the dynamic password computer startup protection program, whether the password is valid, if so, the dynamic password computer startup protection program loads a computer startup program of the computer; otherwise the dynamic password computer startup protection program does not load the computer startup program of the computer; the password generating factor is current time or current authenticating count of the dynamic password generating device.

According to the second aspect of the present invention, there is provided a system for computer startup protection, wherein the system includes a computer and a dynamic password generating device; the computer includes a pre-processing module adapted to power up the computer and load and execute a dynamic password computer startup protection program; a receiving module adapted to receive, by using the dynamic password computer startup protection program, a password entered by the user after the processing of the pre-processing module; a determining module adapted to determine whether the password is valid by the dynamic password computer startup protection program when the receiving module receives the password; a loading module adapted to load a computer startup program of the computer by the dynamic password computer startup protection program if the determining module determines that the password is valid; and a processing module adapted not to load the computer startup program of the computer by the dynamic password computer startup protection program if the determining module determines that the password is not valid; the dynamic password generating device includes a receiving module adapted to receive a dynamic password generating command from the user; a generating module adapted to generate a password according to a factor and an algorithm for dynamic password generation when the receiving module receives the dynamic password generating command, in which the password generating factor is current time or current authenticating count of the dynamic password generating device; and an output module adapted to output the password generated by the generating module.

According to the third aspect of the present invention, there is provided a method for computer startup protection includes: loading and executing, by a computer, a dynamic password computer startup protection program; transferring, by the computer, the control right to the dynamic password computer startup protection program; generating and outputting, by the dynamic password computer startup protection program, challenge data; entering, by a user, the challenge data into a dynamic password generating device; receiving, by the dynamic password computer startup protection program, a password entered by the user, in which the password is obtained by the dynamic password generating device according to the challenge data entered by the user and a dynamic password generating algorithm in the dynamic password generating device; and determining, by the dynamic password computer startup protection program, whether the password is valid, if so, a computer startup program is loaded; otherwise, the computer startup program is not loaded.

According to the fourth aspect of the present invention, there is provided a system for computer startup protection, wherein the system includes a computer and a dynamic password generating device; the computer includes a pre-processing module adapted to load and execute a dynamic password computer startup protection program, and transfer control right of the computer to the dynamic password computer startup protection program; a generating module adapted to generate and output challenge data; a receiving module adapted to receive a password entered by the user by the dynamic password computer startup protection program after the processing of the preprocessing module; a determining module adapted to determine whether the password is valid by the dynamic password computer startup program after the receiving module receives the password; a loading module adapted to load a computer startup program by the dynamic password computer startup protection program after the determining module determines that the password is valid; and a processing module adapted not to load a computer startup program by the dynamic password computer startup protection program after the determining module determines that the password is not valid; and the dynamic password generating device includes a receiving module adapted to receive challenge data entered by the user and a command of generating a dynamic password from the user; a generating module adapted to generate a dynamic password according to the challenge data received by the receiving module and a dynamic password generating algorithm in the dynamic password generating device; and an output module adapted to output the dynamic password generated by the generating module.

According to the present invention, the method of computer startup adopts dynamic password technology and enhances the security level of the system; the security token does not need to be connected to the computer, which saves the cost of research, guarantees the stability of the system, and reduces the requirement of the configuration of the user computer; and the dynamic password does not need to be remembered by the user, which solves the problem that the user has to be forced to remember the password and enhances the usability of the system.

DETAILED DESCRIPTION OF THE PREFERRED EMBODIMENTS

In order to make the purpose, technical solution and advantages clearer, the present invention is further described with the embodiments and the drawings below.

Embodiment 1

Figure 1:
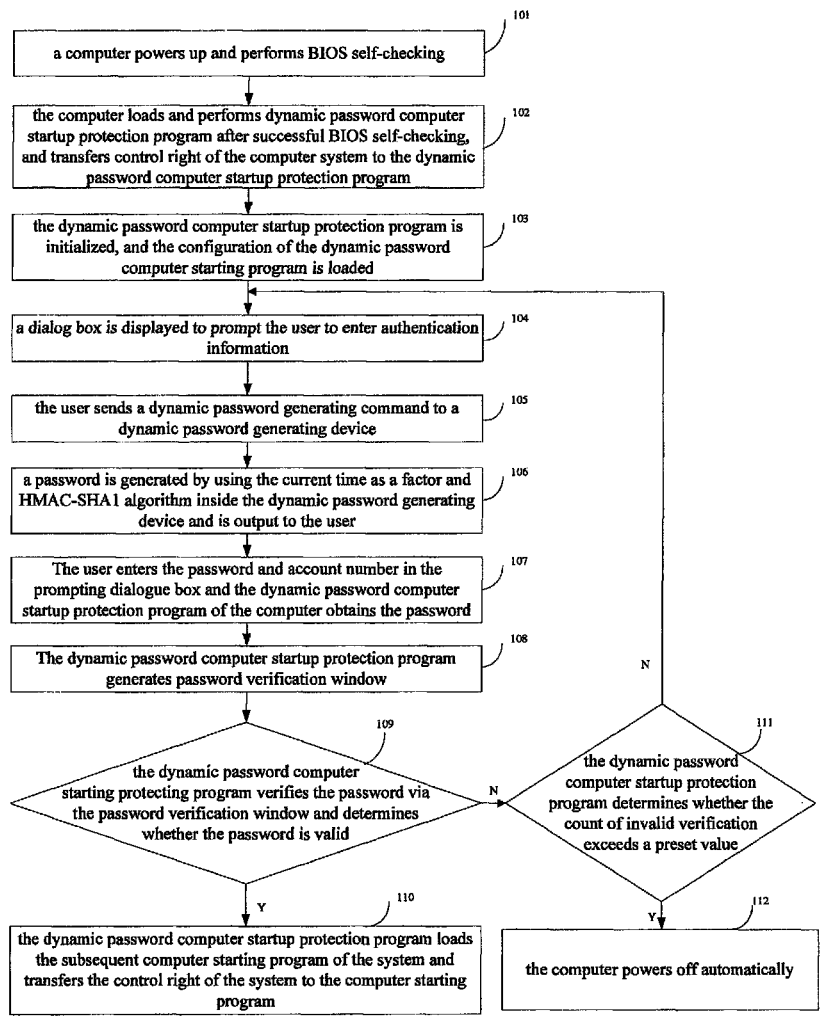
FIG. 1 is the flow chart of method for computer startup protection according to embodiment 1 of the present invention.

Referring to FIG. 1, embodiment 1 of the invention provides a method for computer startup protection, the details is as following:

Step 101: a computer powers up and performs BIOS self-checking;

In embodiment 1, a dynamic password computer startup protection program is located as a part in BIOS program, or located in master boot record of hard disk. Thereby, if the dynamic password computer startup protection program is located in BIOS, the dynamic password computer startup protection program is written into the preset location of the BIOS via a main board development tool of the computer.

If the dynamic password computer startup protection program is located in the master boot record, the dynamic password computer startup protection program is written in the master boot rec/ord of hard disk via a development tool of the computer, and the information of division table is reserved as well, for example, the Cylinder 0, Head 0, Sector 1 of hard disk and subsequent sectors, etc.

Step 102: the computer loads and performs dynamic password computer startup protection program after successful BIOS self-checking, and transfers control right of the computer system to the dynamic password computer startup protection program.

In embodiment 1, the BIOS program includes self-checking program and the dynamic password computer startup protection program. The self-checking program checks CPU first because all of the normal performance is based on normally performed CPU, if the CPU is performed normally, the self-checking program checks control chip of Key Board, the first RAM with 16 KB, time/number counter 8253, DMA controller, interrupt controller 8259A, displayer, and whether soft disk or hard disk has prompt, print device and asynchronous communications device. If there is no error, the computer will load dynamic password computer startup protection program.

Thereby, if the dynamic password computer startup protection program is located in BIOS, the computer loads and performs dynamic password computer startup protection program after successful BIOS self-checking and transfer control right to the dynamic password computer startup protection program.

If the dynamic password computer startup protection program is located in the master boot record, the computer loads and performs dynamic password computer startup protection program in the master boot record and transfer control right to the dynamic password computer startup protection program.

In order to illustrate embodiment 1 clearly, embodiment 1 gives an example that the dynamic password computer startup protection program is located in BIOS.

Step 103: the dynamic password computer startup protection program is initialized, and the configuration of the dynamic password computer startup program is loaded.

Step 104: a dialog box is displayed to prompt the user to enter authentication information.

Thereby, after the dynamic password computer startup protection program is initialized, the way to prompt the user to enter authentication information can be a dialog box, or other ways such as audio prompt or character prompt. Embodiment 1 is not limited to the specified ways of prompts.

Step 105: the user sends a dynamic password generating command to a dynamic password generating device.

In step 105, the user sends the dynamic password generating command to the dynamic password generating device via pressing a button, scanning fingerprint of the user, a sonic switch, a body temperature sensor, a photoelectric switch, or a pressure sensor. The present invention is not limited to the ways mentioned above.

Step 106: a password is generated by using the current time as a factor and HMAC-SHA1 algorithm inside the dynamic password generating device and is output to the user.

When the dynamic password generating device receives a dynamic password generating command, the device generates a password by using the current time as a factor and preferred HMAC-SHA1 algorithm inside the dynamic password generating device and outputs the password to the user. The HMAC-SHA1 algorithm is the preferred algorithm. The password can be generated by using other algorithms, such as hmac_sha256, hma_sha512, and hmac_md5.

The steps of generating a one time password (OTP) by using the HMAC-SHA1 algorithm based on time are as the following:

1. Obtaining a different value in second ($\Delta T$) between the current time (T1) and the basic time (T0, e.g. 1970-01-01 00:00:00);
2. Calculating $T=\Delta T/X$ (X is a value of preset time interval, for example, 30 seconds, that is to say, X=30);
3. Obtaining seed K of a token;
4. Computing a digest value: D=HMAC-SHA1(K, T);
5. Making high four bit of the last byte of the digest value D to be index: idx;
6. R=(D[idx] & 0x7F)<<24)+(D[idx+1]<<16)+(D[idx+2]<<8)+(D[idx+3]);
7. Obtaining OTP=R mod (10 ^6).

The OTP technology involved in embodiment 1 means that the password of the user is changing constantly and dynamically based on time, and the password generated at a time can be used once only. Accordingly, the dynamic authentication mode adopts dedicate hardware called security token (security token can be implemented by software such as java program), which has an inbuilt password generating chip for generating a password by performing professional cryptography algorithm according to the current time and outputting the password.

The dynamic password generating device outputs the dynamic password in the following ways.

Displaying the password, outputting the password in a way of audio or vibrating, or touching by the user. Embodiment 1 is not limited to the specific ways of outputting the dynamic password.

Step 107: The user enters the password and account number in the prompting dialogue box and the dynamic password computer startup protection program of the computer obtains the password.

In step 107, the dialogue box can be set up as required for the user to enter the password. Further more, referring to table 1, the dialogue box includes prompting information such as general user account, PIN code, and serial number of the dynamic password generating device, etc.

TABLE 1

| user account | feitian |
| PIN code | 2008feitian |
| serial number of the dynamic password generating device | 123456789 |
| Password | abcd123 |

Referring to Table 1, if the dialogue box includes prompting information such as general user account, PIN code, and serial number of the dynamic password generating device, etc., the computer needs to verify all of the information above successfully and then obtains the dynamic password. For the convenient of illustration, user account and dynamic password are exemplified in embodiment 1.

Step 108: the dynamic password computer startup protection program uses the obtained user account as index to find an algorithm of the dynamic password generating device, HMAC-SHA1, bound with the user account in the computer. The dynamic password computer startup protection program generates password verification window by using the current time of system as a factor and the algorithm.

In step 108, the corresponding relationship between the dynamic password generating device and the user account is prestored in the preset location of BIOS.

Step 109: the dynamic password computer startup protection program verifies the password via the password verification window and determines whether the password is valid, if so, go to step 110; otherwise go to step 111;

specifically, the dynamic password computer startup protection program verifies the dynamic password via the password verification window and the details is as follows.

The clock frequency of the dynamic password generating device is synchronized to the clock frequency of the computer system. Preferably, the dynamic password generating device generates a password with 6 digits inside every 30 seconds and the dynamic password computer startup protection program generates an authentication password every 30 seconds.

In order to secure the veracity and reliability of the verification, the verification window includes 5 authentication passwords generated by using HMAC-SHA1 algorithm. If the password is same as one of the 5 authentication passwords generated by the dynamic password computer startup protection program, the password is valid; otherwise, the password is not valid. That is to say, if the password is in the category of the verification window, the password is valid; otherwise, the password is not valid.

Step 110: the dynamic password computer startup protection program loads the subsequent computer startup program of the system and transfers the control right of the system to the computer startup program. The computer startup program transfers the control right to the operation system or operation program of the memory address.

Step 111: the dynamic password computer startup protection program determines whether the count of invalid verification exceeds a preset value, if so, go to step 112; otherwise, go to step 104.

In step 111, the process that dynamic password computer startup protection program determines whether the time of invalid verification exceeds the preset time is considered from the actual operation of the user, so as to secure flexibility of the solution provided by embodiment 1.

Step 112: the computer powers off automatically.

Furthermore, in the method provided by embodiment 1 of the invention, the dynamic password computer startup protection program also performs time synchronization with the dynamic password generating device, which reduces verification error as possible and improves the veracity of implementing the method. Referring to step 109, the steps that the dynamic password computer startup protection program performs time synchronization with the dynamic password generating device include:

obtaining the current time of the computer when the dynamic password computer startup protection program generates the verification window (for the convenience of illustration, the current time of the computer is defined as a first time value);

obtaining the current time of the computer when the password matches one of the values of the verification window (for the convenience of illustration, the current time of the computer is defined as a second time value); and obtaining the time difference value between the first time value and the second time value.

Figure 2:
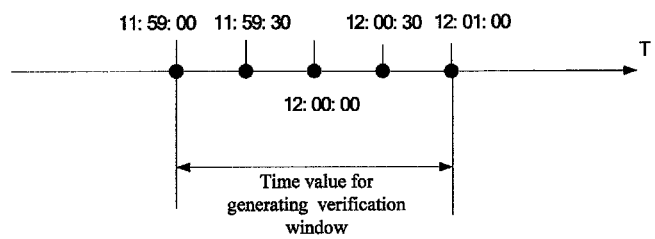
FIG. 2 is the schematic diagram of the time values for generating verification window according to embodiment 1 of the present invention.

Referring to FIG. 2, in the process of generating the verification window, the first time value of the computer (if T=12: 00:00), the values got by the first time value plus/minus N seconds (e.g. 60 seconds), and the values got by the first time value plus/minus M seconds (e.g. 30 seconds) are calculated respectively as factors. Referring to FIG. 2, if the password matches that the time value which equals to the first time value added 30 seconds, the time difference between the first time value (T=12:00:00) and the second time value (T=12: 00:30) is 30 seconds, which is the time different value to be obtained. The time different value is adapted to implement time synchronization between the dynamic password computer startup protection program and dynamic password generating device. The dynamic password computer startup protection program can restrain the drifting of the verification window according to the time difference value, which reduces verification error as possible and improves the correctness of the method for computer startup.

Furthermore, from the method in embodiment 1, those skilled in the art can infer that the method is also adapted to the case that the computer stores a dynamic password generating algorithm corresponding to an algorithm stored in the dynamic password generating device. Thereby, the dynamic password generating algorithm is prestored in the preset location of BIOS of the computer or the hard disk of the computer. Correspondingly, a step before the dynamic password computer startup protection program of the computer determines whether the received password is valid includes:

When the dynamic password computer startup protection program receives the password entered by the user, the program obtains directly the dynamic password generating algorithm, which is corresponding to the algorithm of the dynamic password generating device, prestored in the preset location of BIOS or the preset location of hard disk;

Correspondingly, the step of determining whether the password received is valid by the dynamic password computer startup protection program of the computer includes that the dynamic password computer startup protection program generates verification window according to the obtained dynamic password generating algorithm, and the dynamic password computer startup protection program determines whether the password is in the category of the verification window, if so, the password is valid; otherwise, the password is not valid. That is to say, by using the method of embodiment 1 provided by the present invention, when the computer startup protection is needed, the user just needs to obtain a dynamic password generated by the dynamic password device which is corresponding to the computer directly and enter the dynamic password into the dynamic password computer startup protection program. The dynamic password computer startup protection program verifies the dynamic password directly. The step above enhances the flexibility of the method and the completion of the technical solution provided by the invention.

In a word, embodiment 1 provides a method of computer startup protection which adopts dynamic password technology and enhances the security level of the system; the security token need not be connected to the computer, which saves the cost of research, guarantees the stability of the system, and reduces the requirement of the configuration of the user computer; and the dynamic password need not be remembered by the user, which solves the problem that the user has to be forced to remember the password and enhances the usability of the system.

Embodiment 2

Figure 3:
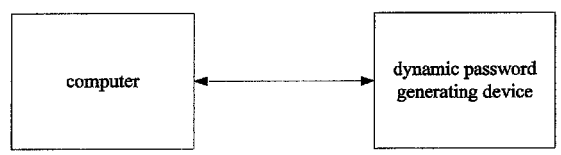
FIG. 3 is the schematic diagram of the system of computer startup protection according to embodiment 2 of the present invention.
Figure 4:
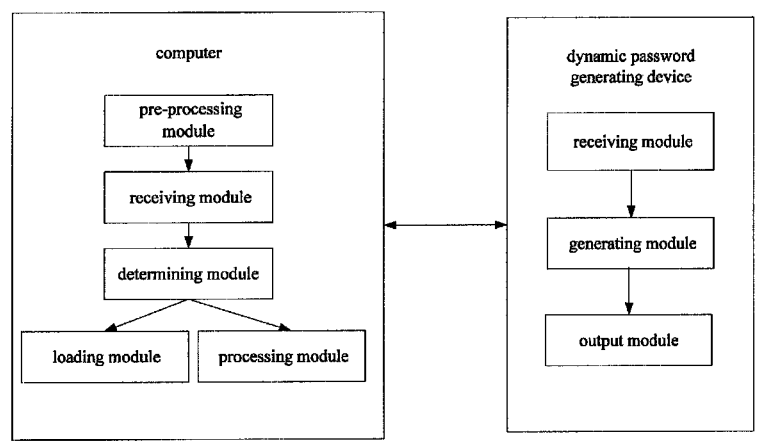
FIG. 4 is the detailed schematic diagram of the system of computer startup protection according to embodiment 2 of the present invention.

Referring to FIG. 3, a system for computer startup protection includes a computer and a dynamic password generating device; referring to FIG. 4, the computer includes a pre-processing module, a receiving module, a determining module, a loading module, and a processing module; and the dynamic password generating device includes a receiving module, a generating module, and an output module.

In the computer, the pre-processing module is adapted to power up the computer and load and execute a dynamic password computer startup protection program;

the receiving module is adapted to receive, by using the dynamic password computer startup protection program, a password entered by a user after the processing of the pre-processing module;

the determining module is adapted to determine whether the password is valid by the dynamic password computer startup protection program when the receiving module receives the password;

the loading module is adapted to load a computer startup program of the computer by the dynamic password computer startup protection program when the determining module determines that the password is valid; and the processing module is adapted not to load the computer startup program of the computer by the dynamic password computer startup protection program when the determining module determines that the password is not valid.

In the dynamic password generating device, the receiving module is adapted to receive a dynamic password generating command from the user;

the generating module is adapted to generate a password according to current time of the dynamic password generating device and an algorithm for dynamic password generation when the receiving module receives the dynamic password generating command; and the output module is adapted to output the password generated by the generating module.

The pre-processing module includes a powering up unit adapted to power up the computer;

a first loading unit adapted to write, by a main board developing tool, the dynamic password computer startup protection program into the preset location of BIOS when the powering up unit powers up the computer if the dynamic password computer startup protection program is located in the BIOS;

a second loading unit adapted to write, by a developing tool of the computer, the dynamic password computer startup protection program into the location of the master boot record and reserve the information of the division table when the powering up unit powers up the computer if the dynamic password computer startup protection program is located in the master boot record;

a first loading and executing unit adapted to load and execute the dynamic password computer startup protection program and transfer control right to the dynamic password computer startup protection program after successful BIOS self-checking when the first loading unit writes the dynamic password computer startup protection program into the preset location of BIOS; and a second loading and executing unit adapted to load and execute the dynamic password computer startup protection program and transfer control right to the dynamic password computer startup protection program after successful BIOS self-checking when the second loading unit writes the dynamic password computer startup protection program into the location of the master boot record and reserves the information of the division table.

The computer further includes a prompting module adapted to prompt the user to enter user information;

correspondingly, the receiving module of the computer is also adapted to receive the user information, which includes account information and PIN code of the user;

correspondingly, the determining module of the computer specifically includes an obtaining unit adapted to obtain a password generating password algorithm corresponding to the user information according to the corresponding relationship between the user information at the preset location of BIOS or the hard disk and the identifier of the dynamic password generating device if the user information verified by the dynamic password computer startup protection program successfully;

a generating unit adapted to generate a verification window according to the algorithm obtained by the obtaining unit; and a verifying unit adapted to determine whether the password is in the category of the verification window generated by the generating unit, if so, the password is valid; otherwise, the password is not valid.

The determining module of the computer further includes a setting up unit adapted to set up a threshold value of the count of invalid verification, correspondingly, the determining module of the computer further includes a processing unit adapted to determine whether the count of invalid verification exceeds the preset threshold value, if so, the computer powers off automatically; otherwise, the computer prompts the user to enter a password one more time.

The generating unit of the determining module of the computer is specifically adapted to generate a sequence of passwords, by the dynamic password computer startup protection program, via using the value of current time of the computer or the value obtained by deducting/adding a value of a preset time period from/to the value of current time as factor and the dynamic password generating algorithm; the sequence of passwords is regarded as the verification window; the verification window includes several random passwords in a category of a valid verification time.

The computer further includes a synchronizing module adapted to implement time between the dynamic password computer startup protection program and the dynamic password generating device.

The synchronizing module includes a current time value obtaining unit adapted to obtain the value of current system time of the computer when the dynamic password computer startup protection program generates the verification window, and record the value as a first time value;

a matched time value obtaining unit adapted to obtain the value of the factor of time corresponding to the value of the verification window which is matched with the password, and record the value as a second time value; and a synchronizing unit adapted to calculate the different value between the first time value and the second time value, in which the different value is adapted to implement the time synchronization between the dynamic password computer startup protection program and the dynamic password generating device.

The process that the receiving module above receives the dynamic password generating command from the user can be implemented in many ways such as pressing a button, or scanning fingerprint, a sound control switch, a temperature sensor, a pressure sensor, or a photoelectric sensor etc. Embodiment 2 of the invention does not limited to the ways and methods implemented specifically.

The output module includes at least one of the following units:

a first output unit adapted to output the password generated by the generating module by displaying the password;

a second output unit adapted to output the password generated by the generating module audibly;

a third output unit adapted to output the password generated by the generating module by vibration; and a fourth output unit adapted to output the password generated by the generating module by touch of the user.

The computer further includes an obtaining module adapted to obtain an algorithm, which is stored in the preset location of BIOS or hard disk of the computer, corresponding to the dynamic password generating algorithm of the dynamic password generating device.

Specifically, the security device provided by embodiment 2 of the invention can be a security token.

In a word, embodiment 2 provides a system of computer startup protection which adopts dynamic password technology and enhances the security level of the system; the security token need not be connected to the computer, which saves the cost of research, guarantees the stability of the system, and reduces the requirement of the configuration of the user computer; and the dynamic password need not be remembered by the user, which solves the problem that the user has to be forced to remember the password and enhances the usability of the system.

Embodiment 3

Figure 5:
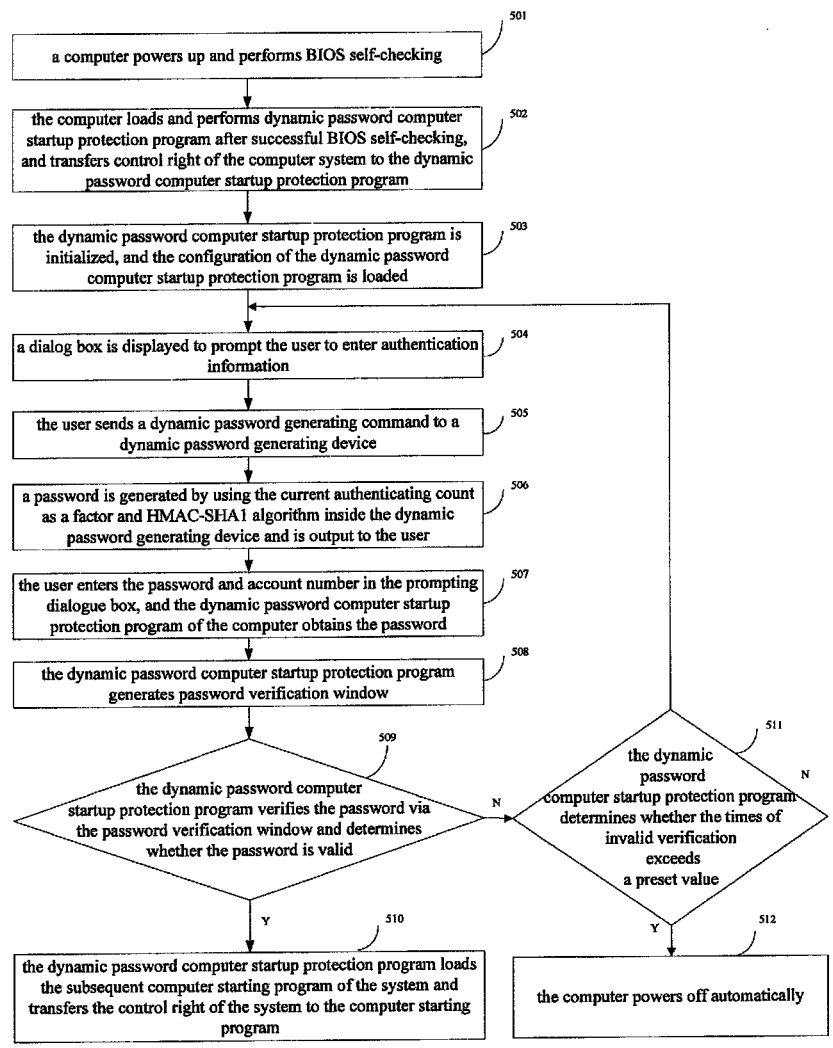
FIG. 5 is the flow chart of method for computer startup protection according to embodiment 3 of the present invention.

Referring to FIG. 5, embodiment 3 of the invention provides a method for computer startup protection, the details is as follows.

Step 501: a computer powers up and performs BIOS self-checking.

In embodiment 3, dynamic password computer startup protection program may be located in BIOS program as a part of BIOS program, or located in the master boot record of hard disk. Thereby, if the dynamic password computer startup protection program is located in BIOS, the dynamic password computer startup protection program is written into the preset location of the BIOS via a main board development tool of the computer.

If the dynamic password computer startup protection program is located in the master boot record, the dynamic password computer startup protection program is written in the master boot record of hard disk via a development tool of the computer, and the information of division table is reserved as well, for example, the Cylinder 0, Head 0, Sector 1 of hard disk and subsequent sectors, etc.

Step 502: the computer loads and performs dynamic password computer startup protection program after successful BIOS self-checking, and transfers control right of the computer system to the dynamic password computer startup protection program.

In embodiment 3, the BIOS program includes self-checking program and the dynamic password computer startup protection program. The self-checking program checks CPU firstly. If the CPU is performed normally, then the self-checking program checks control chip of Key Board, the first RAM with 16 KB, time/number counter 8253, DMA controller, interrupt controller 8259A, displayer, soft disk, hard disk, print device and asynchronous communications device. If there is no error, the computer will load the dynamic password computer startup protection program.

Thereby, if the dynamic password computer startup protection program is located in BIOS, the computer loads and performs the dynamic password computer startup protection program after successful BIOS self-checking and transfer control right to the dynamic password computer startup protection program.

If the dynamic password computer startup protection program is located in the master boot record program, the computer loads and performs dynamic password computer startup protection program in the master boot record and transfer the control right to the dynamic password computer startup protection program.

In order to illustrate embodiment 3 clearly, it gives an example that the dynamic password computer startup protection program is located in BIOS.

Step 503: the dynamic password computer startup protection program is initialized, and the configuration of the dynamic password computer startup program is loaded.

Step 504: a dialog box is displayed to prompt the user to enter authentication information.

Thereby, after the dynamic password computer startup protection program is initialized, the way to prompt the user to enter authentication information can be a dialog box, or other ways such as audio prompt or character prompt. Embodiment 3 is not limited to the specified ways of prompts.

Step 505: the user sends a dynamic password generating command to a dynamic password generating device.

In step 505, the user sends the dynamic password generating command to a dynamic password generating device via pressing a button, or scanning fingerprint of the user, a sonic switch, a body temperature sensor, a photoelectric switch, or a pressure sensor. Embodiment 3 of the present invention is not limited to the ways mentioned above.

Step 506: a password is generated by using the current authenticating count as a factor and HMAC-SHA1 algorithm inside the dynamic password generating device and is output to the user.

When the dynamic password generating device receives a dynamic password generating command from the user, the device generates a password by using the current authenticating count as a factor and preferred HMAC-SHA1 algorithm inside the dynamic password generating device and outputs the password to the user. The HMAC-SHA1 algorithm is a preferred algorithm. The password can be generated by using any other algorithms, such as hmac_sha256, hma_sha512, or hmac_md5.

The OTP technology involved in embodiment 3 means that the password of the user is changing constantly and dynamically based on authenticating count, and the password generated at a time can be used once only. Accordingly, the dynamic password authentication mode adopts dedicate hardware called security token (security token can be implemented by software such as java program), which has an inbuilt password generating chip for generating a password by performing professional cryptography algorithm according to the current authenticating count and outputs the password.

The dynamic password generating device outputs the dynamic password in the following ways.

Displaying the password (by a displayer), outputting the password in a way of audio or vibrating, or touching by the user (e.g. convexo/concave contacts). The embodiment 3 is not limited to the specific ways of outputting the dynamic password.

Step 507: The user enters the password and account number in the prompting dialogue box, and the dynamic password computer startup protection program of the computer obtains the password.

In step 507, the dialogue box can be set up according to specific needs for user to enter the password. Further more, referring to table 2, the dialogue box includes prompting information such as general user account, PIN code and serial number of the dynamic password generating device, etc.

TABLE 2

| User account | feitian |
| PIN code | 2008feitian |
| serial number of the dynamic password generating device | 123456789 |
| Password | abcd123 |

Referring to table 2, when the dialogue box includes prompting information such as general user account, PIN code, and serial number of the dynamic password generating device, etc., the computer needs to verify all of the information above successfully to obtain the dynamic password. For the convenient of illustration, user account and dynamic password are exemplified in embodiment 3.

Step 508: the dynamic password computer startup protection program uses the obtained user account as index and finds an algorithm of the dynamic password generating device bound with the user account in the computer, HMAC-SHA1. The dynamic password computer startup protection program generates password verification window by using the current authenticating count of system as a factor and the algorithm.

In step 508, the corresponding relationship between the dynamic password generating device and the user account is prestored in the preset location of BIOS.

Step 509: the dynamic password computer startup protection program verifies the password via the password verification window and determines whether the password is valid, if so go to step 510; otherwise go to step 511;

specifically, the dynamic password computer startup protection program verifies the password via the password verification window as follows.

Because the information of the dynamic password generating device is stored in the computer system, the using times of the dynamic password generating device is accord with the authenticating count of the computer system. For example, the computer has information of a dynamic password device with serial number of 123456789. If it is the tenth time for the user to get a dynamic password from the dynamic password device, correspondingly, the authenticating count accord with the using times for the dynamic password device should be 10.

In order to secure the veracity and reliability of authentication, the verification code window includes 5 verification codes generated by using HMAC-SHA1 algorithm and the current authenticating count value, or the count value which are gotten by that the current authenticating count value add/minus count value 5 and count value 6 respectively as factors. If the password is same as one of the 5 verification codes generated by the dynamic password computer startup protection program, the password is valid; otherwise, the password is invalid. That is to say, when the password is in the category of the verification code window, the password is regarded as valid, otherwise, the password is not valid.

Step 510: the dynamic password computer startup protection program loads subsequent computer startup program of the computer system and transfers control right of the system to the computer startup program. The computer startup program transfers control right to the operation system or operation program of the memory address.

Step 511: the dynamic password computer startup protection program determines whether the count of invalid verification exceeds a preset value, if so, go to step 512; otherwise, go to step 504;

In step 504, the process that dynamic password computer startup protection program determines whether the time of invalid verification exceeds the preset time is considered from the actual conditions of the user, so as to secure flexibility of the solution provided by embodiment 3.

Step 512: the computer powers off automatically.

Furthermore, in the method provided by embodiment 3 of the invention, the dynamic password computer startup protection program also performs event synchronization with the dynamic password generating device, which reduces verification error and improves the veracity of method implement. Referring to step 509, the steps that the dynamic password computer startup protection program performs event synchronization with the dynamic password generating device include:

obtaining the current authenticating count of the computer when the dynamic password computer startup protection program generates verification window (for the convenience of illustration, the current authenticating count of the computer is defined as a first count value);

obtaining the current authenticating count of the computer if the password matches one of the values of the verification window (for the convenience of illustration, the current time of the computer is defined as a second count value); and obtaining the times difference value between the first count value and the second count value.

In the process of generating verification window, the first count value of the computer (for example, X=100 times) and the values got by the first count value plus/minus count value N (e.g. N=3) and the first count value plus/minus count value M (e.g. M=5) are calculated respectively as factors. If the password matches the count value which equals to the first time value added count value 5, the times difference between the first count value (for example, X=100 times) and the second time value (Y=105 times) is 5 times, so that the times different value is obtained. The times different value is adapted to implement event synchronization between the dynamic password computer startup protection program and the dynamic password generating device. The dynamic password computer startup protection program can restrain the drifting of the verification window according to the times difference value, which reduces verification error as possible and improves the correctness of the method for computer startup.

Furthermore, from the method of embodiment 3, those skilled in the art can infer that the method is also adapted to the case that the computer has an algorithm, which is prestored in the preset location of BIOS of the computer or the hard disk of the computer, corresponding to the dynamic password generating algorithm stored in the dynamic password generating device. Correspondingly, a step before the dynamic password computer startup protection program of the computer determines whether the received password is valid includes:

when the dynamic password computer startup protection program receives the password entered by the user, the program obtains directly an algorithm, which is corresponding to the dynamic password generating algorithm in the dynamic password generating device, prestored in the preset location of BIOS or hard disk;

correspondingly, the step of determining whether the password received by the dynamic password computer startup protection program of the computer is valid includes that the dynamic password computer startup protection program generates verification window according to the obtained algorithm, and determines whether the received password is in the category of the verification window, if so, the password is valid; otherwise, the password is not valid. That is to say, in the method provided by embodiment 3, when the computer startup protection is implemented, the user just needs to obtain directly a password generated by the dynamic password device which is corresponding to the computer and enter the password into the dynamic password computer startup protection program. The dynamic password computer startup protection program verifies the dynamic password directly. The step above enhances the flexibility of the method and the completion of the technical solution provided by the invention.

Those skilled in the art can also infer a step after generating a sequence of passwords, by the dynamic password computer startup protection program, includes that the dynamic password computer startup protection program adds 1 to the value of the current count;

correspondingly, a step after that the dynamic password generating device receives the dynamic password generating command from the user and generates a password according to the current authenticating count and the dynamic password generating algorithm includes that the dynamic password generating device adds 1 to the value of current authenticating count.

Embodiment 4

Figure 6:
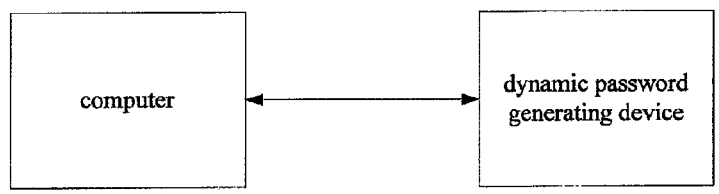
FIG. 6 is the schematic diagram of the system of computer startup protection according to embodiment 4 of the present invention.
Figure 7:
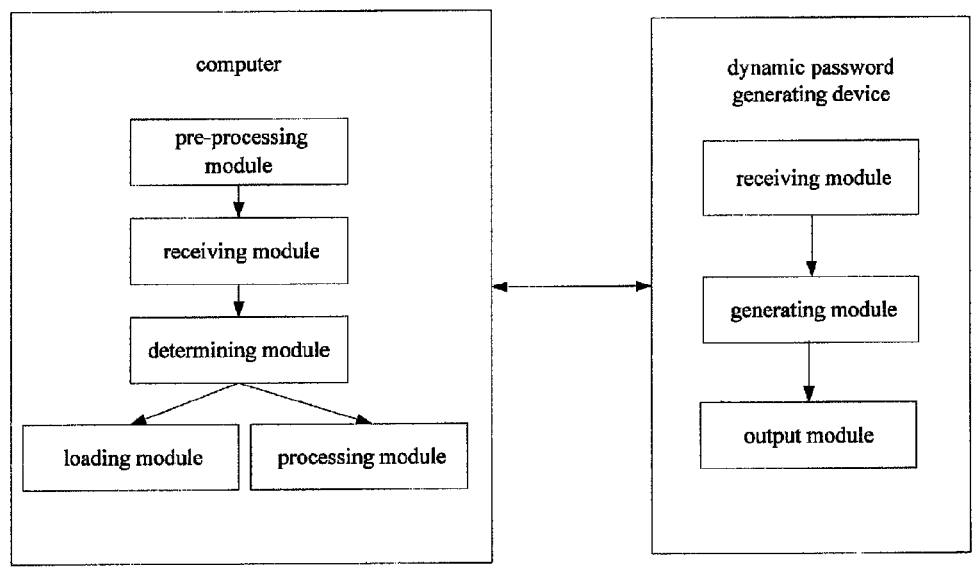
FIG. 7 is the detailed schematic diagram of the system of computer startup protection according to embodiment 4 of the present invention.

Referring FIG. 6, a system for computer startup protection includes a computer and a dynamic password generating device; referring to FIG. 7, the computer includes a pre-processing module, a receiving module, a determining module, a loading module, and a processing module; and the dynamic password generating device includes a receiving module, a generating module and an output module.

In the computer, the pre-processing module is adapted to power up the computer, load and execute a dynamic password computer startup protection program;

the receiving module is adapted to receive, by using the dynamic password computer startup protection program, a password entered by the user after the processing of the pre-processing module;

the determining module is adapted to determine whether the password is valid by the dynamic password computer startup protection program when the receiving module receives the password;

the loading module is adapted to load computer startup program of the computer by the dynamic password computer startup protection program if the determining module determines that the password is valid; and the processing module is adapted not to load the computer startup program of the computer by the dynamic password computer startup protection program if the determining module determines that the password is not valid.

In the dynamic password generating device, the receiving module is adapted to receive a dynamic password generating command from the user;

the generating module is adapted to generate a password according to current authenticating count of the dynamic password generating device and an dynamic password generating algorithm when the receiving module receives the dynamic password generating command; and the output module is adapted to output the password generated by the generating module.

The pre-processing module of the computer further includes a powering up unit adapted to power up the computer;

a first loading unit adapted to write, by a main board developing tool, the dynamic password computer startup protection program into the preset location of BIOS when the powering up unit powers up the computer if the dynamic password computer startup protection program is located in the BIOS;

a second loading unit adapted to write, by a developing tool of the computer, the dynamic password computer startup protection program into the location of the master boot record of hard disk and reserve the information of the division table when the powering up unit powers up the computer if the dynamic password computer startup protection program is located in the master boot record;

a first loading and executing unit adapted to load and execute the dynamic password computer startup protection program and transfer control right to the dynamic password computer startup protection program after successful BIOS self-checking and that the first loading unit writes the dynamic password computer startup protection program into the preset location of BIOS; and a second loading and executing unit adapted to load and execute the dynamic password computer startup protection program and transfer control right to the dynamic password computer startup protection program after successful BIOS self-checking and that the second loading unit writes the dynamic password computer startup protection program into the location of the master boot record and reserves the information of the division table.

The computer further includes a prompting module adapted to prompt the user to enter user information;

correspondingly, the receiving module of the computer is also adapted to receive the user information, which includes account information and PIN code of the user;

correspondingly, the determining module of the computer specifically includes an obtaining module adapted to obtain a password generating password algorithm corresponding to the user information according to the corresponding relationship between the user information at the preset location of BIOS or the hard disk and the identifier of the dynamic password generating device when the user information passes the verification by the dynamic password computer startup protection program;

a generating unit adapted to generate verification window according to the algorithm obtained by the obtaining unit; and a verifying unit adapted to determine whether the password is in the category of the verification window generated by the generating unit, if so, the password is valid; otherwise, the password is invalid.

The determining module of the computer further includes a setting up unit adapted to set up a threshold value of the count of invalid verification, correspondingly, the determining module of the computer further includes a processing unit adapted to determine whether the count of invalid verification exceeds the preset the threshold value, if so, the computer powers off automatically, otherwise, the computer prompts the user to enter a password one more time.

The generating unit in the determining module of the computer specifically is adapted to generate a sequence of passwords, by the dynamic password computer startup protection program, via using the value of current authenticating count of the computer or the value obtained by deducting/adding a preset count value from/to the value of current authenticating count as factor and the dynamic password generating algorithm, the sequence of passwords is regarded as constructing a verification window; and the verification window includes several random passwords in a category of a valid authenticating count.

The computer further includes a synchronizing module adapted to implement event synchronization between the dynamic password computer startup protection program and the dynamic password generating device.

The synchronizing module further includes a current count value obtaining unit adapted to obtain the value of the current authenticating count of the computer system when the dynamic password computer startup protection program generates the verification window, and record the value as a first count value;

a matched count value obtaining unit adapted to obtain the value of the factor of the authenticating count corresponding to the value of the verification window which is matched with the password, and record the value as a second count value; and a synchronizing unit adapted to calculate the different value between the first count value and the second count value, in which the different value is adapted to implement the event synchronization between the dynamic password generating protecting program and the password generating device.

The output module includes at least one of the following units:

a first output unit adapted to output the password generated by the generating module by displaying the password;

a second output unit adapted to output the password generated by the generating module audibly;

a third output unit adapted to output the password generated by the generating module by vibration; and a fourth output unit adapted to output the password generated by the generating module by touch of the user.

The computer further includes an obtaining module adapted to obtain an algorithm, which is stored in the preset location of BIOS or hard disk of the computer, corresponding to the dynamic password generating algorithm of the dynamic password generating device.

The computer further includes a count increasing module adapted for the dynamic password computer startup protection program to add 1 to the value of the current count when the dynamic password computer startup protection program generates a sequence of passwords;

correspondingly, the dynamic password generating device also includes a count increasing module adapted for the dynamic password generating device to add 1 to the value of current authenticating count when the generating module of the dynamic password generating device generates a password.

The dynamic password generating device in embodiment 4 can be a security token.

Embodiment 5

Figure 8:
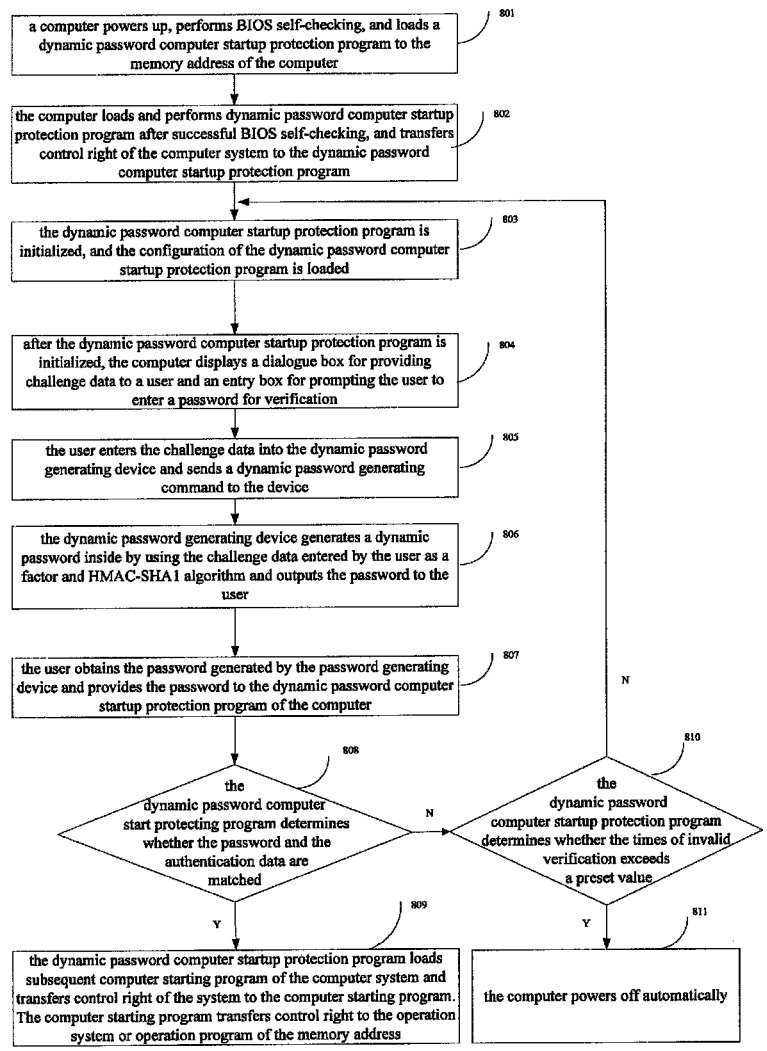
FIG. 8 is the flow chart of method for computer startup protection according to embodiment 5 of the present invention.

Referring to FIG. 8, embodiment 5 provides a method for computer startup protection. Embodiment 5 of the invention gives an example that a dynamic password generating device generates a password according to the factor which is challenge data generated from a computer. The detail is as follows.

Step 801: a computer powers up, performs BIOS self-checking, and loads a dynamic password computer startup protection program to the memory address of the computer.

In embodiment 5, a dynamic password computer startup protection program is located in BIOS as a part of BIOS program, or is located in the master boot record of hard disk. Thereby, if the dynamic password computer startup protection program is located in BIOS, the dynamic password computer startup protection program is written into the preset location of the BIOS via a main board development tool of the computer.

If the dynamic password computer startup protection program is located in the master boot record, the dynamic password computer startup protection program is written in the master boot record of hard disk via a development tool of the computer, and the information of division table is reserved as well, for example, the Cylinder 0, Head 0, Sector 1 of hard disk and subsequent sectors, etc.

Step 802: the computer loads and performs dynamic password computer startup protection program after successful BIOS self-checking, and transfers control right of the computer system to the dynamic password computer startup protection program.

In embodiment 5, BIOS program includes self-checking program and the dynamic password computer startup protection program. The self-checking program checks CPU first. If the CPU performs normally, then the self-checking program checks control chip of Key Board, the first RAM with 16 KB, time/number counter 8253, DMA controller, interrupt controller 8259A, displayer, soft disk, hard disk, print device and asynchronous communications device. If there is no error, the computer loads the dynamic password computer startup protection program.

Thereby, if the dynamic password computer startup protection program is located in BIOS, the computer loads and performs dynamic password computer startup protection program after successful BIOS self-checking and transfers control right to the dynamic password computer startup protection program.

If the dynamic password computer startup protection program is located in the master boot record program, the computer loads and performs dynamic password computer startup protection program in the master boot record and transfers control right to the dynamic password computer startup protection program.

Embodiment 5 is supposed that the dynamic password computer startup protection program is located in BIOS.

Step 803: the dynamic password computer startup protection program is initialized, and the configuration of the dynamic password computer startup protection program is loaded.

Step 804: after the dynamic password computer startup protection program is initialized, the computer displays a dialogue box for providing challenge data to a user and an entry box for prompting the user to enter a password for verification.

Therein, the dynamic password computer startup protection program generates challenge data randomly with algorithm stored inside and provides the user with the challenge data. The challenge data is factor for generating a dynamic password.

Step 805: the user enters the challenge data into the dynamic password generating device and sends a dynamic password generating command to the device.

The step 805 that the user sends a dynamic password generating command to the device can be implemented in many ways such as pressing a button, scanning fingerprint, sound control switch, temperature sensor, pressure sensor, or photoelectric sensor, etc. Embodiment 5 of the invention is not limited to the ways and methods implemented specifically.

Step 806: the dynamic password generating device generates a dynamic password inside by using the challenge data entered by the user as a factor and HMAC-SHA1 algorithm and outputs the password to the user.

When the dynamic password generating device receives the dynamic password generating command from the user, the device will use the challenge data entered by the user as factor and preferred algorithm HMAC-SHA1 to generate a password and output the password to the user. Therein, the HMAC-SHA1 is a preferred algorithm, the algorithm for generating the password can be one of those algorithms, including hamc_sha256, hma_sha512, and hmac_mad5 etc.

The dynamic password generating technology involved in embodiment 5 is that the dynamic password device generates different passwords according to different challenge data, which is also called dynamic password authentication. Correspondingly, the dynamic password authentication generally adopts dedicated hardware called security token (the security token can also be implemented by software, such as JAVA program of cellphone) which has an inbuilt password generating chip for generating a password by performing professional cryptography algorithm according to the challenge data obtained and outputting the password.

The way for the dynamic password device to output the generated password to the user can be one or combination of the following ways.

The password can be output in displaying form, for example, by a displayer.

The password can be output in audio form.

The password can be output in vibrating form.

The password can be output by the user touching, for example, convexo/concave contacts. Embodiment 5 is not limited to the specified outputting forms.

Step 807: the user obtains the password generated by the password generating device and provides the password to the dynamic password computer startup protection program of the computer.

Step 808: the dynamic password computer startup protection program or the computer receives the password provided by the user and generates authentication data according to password and prestored HMAC-SHA1 algorithm, then determines whether the password and the authentication data are matched, if so, go to step 809; otherwise, go to step 810.

For example, in step 804 that after the dynamic password computer startup protection program is initialized, the computer displays a dialogue box for providing challenge data 123456 to the user.

Correspondingly, in step 806, the dynamic password device uses the challenge data 123456 as factor and HMAC-SHA1 algorithm to generate a password 654321, and outputs the password to the user.

Correspondingly, in step 808, the dynamic password computer startup protection program of the computer receives the password 654321 provided by the user and generates authentication data according to password and prestored HMAC-SHA1 algorithm, if the authentication data is 123456, which shows that the password and the authentication data are matched, the password is valid, if the authentication data is 987654, which shows that the password and the authentication data are not matched and the password is not valid.

Step 809: the dynamic password computer startup protection program loads subsequent computer startup program of the computer system and transfers control right of the system to the computer startup program. The computer startup program transfers control right to the operation system or operation program of the memory address.

Step 810: the dynamic password computer startup protection program determines whether the count of invalid verification exceeds a preset value, if so, go to step 811; otherwise, go to step 804.

In step 810, the process that dynamic password computer startup protection program determines whether the time of invalid verification exceeds the preset time is considered from the actual conditions of the user, so as to secure flexibility of the solution provided by embodiment 5.

Step 811: the computer powers off automatically.

Those skilled in the art can infer that the dynamic password computer startup protection program provided by embodiment 5 can store many authentication password generating algorithms. The authentication password generating algorithms stored in the dynamic password computer startup protection program correspond to the dynamic password generating algorithms stored in the dynamic password generating device by building index or other forms. For example, when the user enters the user information, the authentication password generating algorithm, which stored in the dynamic password computer startup protection program, corresponding to the algorithm in the dynamic password device held by the user, is found according to the index of the user information.

In a word, the embodiment provides a method of computer startup which adopts dynamic password technology and enhances the security level of the system; the security token need not be connected to the computer, which saves the cost of research, guarantees the stability of the system, and reduces the requirement of the configuration of the user computer; and the dynamic password needs not be remembered by the user, which solves the problem that the user has to be forced to remember the password and enhances the usability of the system.

Embodiment 6

Figure 9:
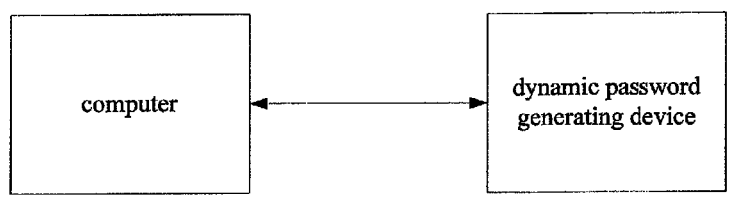
FIG. 9 is the schematic diagram of the system of computer startup protection according to embodiment 6 of the present invention.
Figure 10:
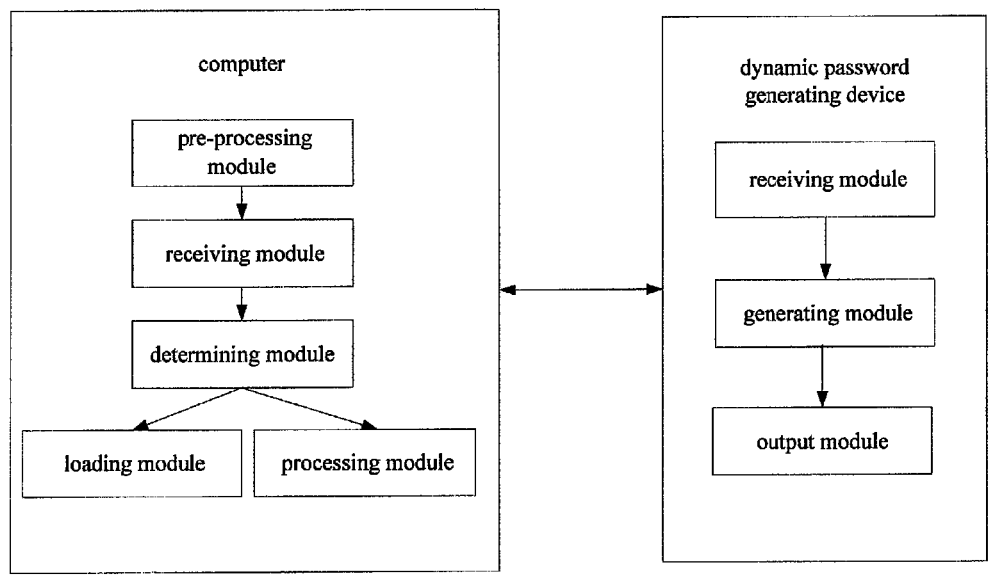
FIG. 10 is the detailed schematic diagram of the system of computer startup protection according to embodiment 6 of the present invention.

Referring to FIG. 9, embodiment 6 of the invention provides a system for computer startup protection includes a computer and a dynamic password generating device. Referring to FIG. 10, the computer includes a pre-processing module, a generating module, a receiving module, a determining module, a loading module, and a processing module; and the dynamic password generating device includes a receiving module, a generating module, and an output module.

In the computer, the pre-processing module is adapted to load and execute a dynamic password computer startup protection program and transfer control right of computer to the dynamic password computer;

the generating module is adapted to generate challenge data and output the challenge data;

the receiving module is adapted to receive, by using the dynamic password computer startup protection program, a password entered by the user after the processing of the pre-processing module;

the determining module is adapted to determine whether the password is valid by the dynamic password computer startup protection program when the receiving module receives the password;

the loading module is adapted to load a computer startup program of the computer by the dynamic password computer startup protection program if the determining module determines that the password is valid; and the processing module is adapted not to load the computer startup program of the computer by the dynamic password computer startup protection program if the determining module determines that the password is not valid.

In the dynamic password generating device, the receiving module is adapted to receive the challenge data and a dynamic password generating command from the user;

the generating module is adapted to generate a password according to the challenge data received by the receiving module and a dynamic password generating algorithm; and the output module is adapted to output the password generated by the generating module.

The process that the receiving module above receives the dynamic password generating command from the user can be implemented in many ways such as pressing a button, or scanning fingerprint, a sound control switch, a temperature sensor, a pressure sensor, or a photoelectric sensor etc. Embodiment 6 of the invention is not limited to the ways and methods implemented specifically.

In the process that the output module above outputs the password generated by the generating module, the output module includes at least one of the following units:

a first output unit adapted to output the password generated by the generating module in displaying form;

a second output unit adapted to output the password generated by the generating module in audio form;

a third output unit adapted to output the password generated by the generating module in vibrating form; and a fourth output unit adapted to output the password generated by the generating module in a form that touched by the user.

The pre-processing module of the computer includes a powering up unit adapted to power up the computer;

a first loading unit adapted to write, by a main board developing tool, the dynamic password computer startup protection program into the preset location of BIOS when the powering up unit powers up the computer if the dynamic password computer startup protection program is located in BIOS;

a second loading unit adapted to write, by a developing tool of the computer, the dynamic password computer startup protection program into the location of the master boot record and reserve the information of the division table when the powering up unit powers up the computer if the dynamic password computer startup protection program is located in the master boot record;

a first loading and executing unit adapted to load and execute the dynamic password computer startup protection program and transfer control right to the dynamic password computer startup protection program after successful BIOS self-checking when the first loading unit writes the dynamic password computer startup protection program into the preset location of BIOS; and a second loading and executing unit adapted to load and execute the dynamic password computer startup protection program and transfer control right to the dynamic password computer startup protection program after successful BIOS self-checking when the second loading unit writes the dynamic password computer startup protection program into the location of the master boot record and reserves the information of the division table.

Correspondingly, the loading module is specifically adapted for the dynamic password computer startup protection program to load start program of the computer when the determining module determines that the password is valid. The start program of the computer transfers control right to the operating program or system which is loaded in the memory address.

Specifically, the preset position of the hard disk of the computer is Cylinder 0, Head 0, Sector 1 of hard disk and subsequent sectors.

Furthermore, the computer includes a prompting module adapted to prompt the user to enter a password; after that the dynamic password computer startup protection program is initialized, the computer may display a dialogue box or made a sound to prompt user to enter a password for authentication. Embodiment 6 is not limited to the specified forms of prompting user mentioned above.

Correspondingly, the determining module of the computer specifically includes an obtaining unit adapted to obtain the authentication password generating algorithm which is corresponding to the dynamic password generating algorithm stored in the dynamic password generating device and prestored in the preset position of the BIOS or the hard disk of the computer;

an authentication data generating unit adapted to generate authentication data according to the authentication password generating algorithm obtained by the obtaining unit; and a verifying unit adapted to determine whether the password is valid.

Furthermore, the determining module of the computer includes a setting unit adapted to set up a threshold value of the count of invalid verification; correspondingly the determining module of the computer further includes a processing unit adapted to determine whether the count of invalid verification exceeds the preset threshold value, if so, the computer powers off automatically; otherwise, the computer prompts the user to enter a password one more time.

Specifically, the receiving module of the dynamic password generating device is adapted to receive the challenge data entered by the user;

a generating module is adapted to generate a password according to the challenge data received by the receiving module and the dynamic password generating algorithm inside the dynamic password generating device; and an output module is adapted to output the password generated by the generating module;

correspondingly, the computer further includes a challenge data processing module adapted to generate challenge data and output the generated challenge data;

a receiving module is specifically adapted to receive the password entered by the user by using the dynamic password computer startup protection program after the processing of pre-processing module; and a determining module is adapted for the dynamic password computer startup protection program to generate authentication data according to the received password and the authentication password generating algorithm and determine whether the authentication data and the password are matched, if so, the password is valid, otherwise, the password is not valid.

Specifically, the dynamic password generating device provided by embodiment 6 of the invention can be a security token.

In a word, embodiment 6 provides a system of computer startup protection which adopts dynamic password technology and enhances the security level of the system; the security token needs not be connected to the computer, which saves the cost of research, guarantees the stability of the system, and reduces the requirement of the configuration of the user computer; and the dynamic password needs not be remembered by the user, which solves the problem that the user has to be forced to remember the password and enhances the usability of the system.

The presently disclosed embodiments should be considered in all respects to be illustrative and not restrictive. The scope of the invention is indicated by the appended claims rather than the foregoing description, and all variations which come within the meaning and range of equivalents thereof are intended to be embraced therein.

What is claimed is:

1. A method for computer startup protection, wherein the method includes:
  writing a dynamic password computer startup protection program into master boot record of hard disk and reserving the information of division table;
  powering up a computer;
  loading and executing, by the computer, the dynamic password computer startup protection program;
  receiving, by the dynamic password computer startup protection program, a password entered by a user; in which the password is obtained by the user via sending a dynamic password generating command to a dynamic password generating device; when the dynamic password generating device receives the dynamic password generating command from the user, the dynamic password generating device generates the password according to a password generating factor and a password generating algorithm, the password generating factor is current time or current authenticating count of the dynamic password generating device;
  generating, by the dynamic password computer startup protection program, a series of authentication passwords using current time or current authenticating count of the system as a factor; and
  determining, by the dynamic password computer startup protection program, whether the password is valid through comparing the password entered by the user with the authentication passwords, if the password entered by the user is equal to one of the authentication passwords, the dynamic password computer startup protection program loads a computer startup program of the computer; otherwise the dynamic password computer startup protection program does not load the computer startup program of the computer in which the dynamic password generating device is not connected with the computer and information of the dynamic password generating device is stored in the computer;

wherein determining, by the dynamic password computer startup protection program, whether the password is valid further includes receiving, by the dynamic password computer startup protection program, the user information which includes account information and PIN code of the user; and the step of determining, by the dynamic password computer startup protection program, whether the password is valid specifically includes after receiving the user information, obtaining, by the dynamic password computer startup protection program, a dynamic password generating algorithm corresponding to the user information according to the corresponding relationship between the user information prestored in the preset location of the hard disk and the identifier of the dynamic password generating device; and generating a verification window according to the obtained dynamic password generating algorithm, and determining whether the password is in the category of the verification window, if so, the password is valid, otherwise the password is not valid.

2. The method of claim 1, wherein determining, by the dynamic password computer startup protection program, whether the password is valid includes after receiving the password entered by the user, obtaining, by the dynamic password computer startup protection program, an algorithm prestored in the preset location of the hard disk of the computer which corresponds to the dynamic password generating algorithm of the dynamic password generating device; and generating, by the dynamic password computer startup protection program, verification window according to the obtained algorithm and determining whether the password is in the category of the verification window, if so, the password is valid, otherwise the password is not valid.

3. The method of claim 1 or 2, wherein the method further includes setting up a threshold value for the count of invalid verification, correspondingly, if the password is not valid, determining whether the count of invalid verification by the user exceeds the threshold value, if so, the computer powers off automatically, otherwise the computer prompts the user to enter a password one more time.

4. The method of claim 1 or 2, wherein the step of generating verification window according to the obtained dynamic password generating algorithm specifically includes generating a sequence of passwords, by the dynamic password computer startup protection program, via using the value of current time of the computer or the value obtained by deducting/adding a value of a preset time period from/to the value of current time as factor and the dynamic password generating algorithm, in which the sequence of passwords is regarded as the verification window; and correspondingly, the verification window includes several random passwords generated in a category of a valid time period.

5. The method of claim 4, wherein the value of the time period specifically is the time value of the update rate of the verification window and the dynamic password computer startup protection program.

6. The method of claim 1 or 2, wherein the step of generating a verification window according to the obtained dynamic password generating algorithm specifically includes generating a sequence of passwords, by the dynamic password computer startup protection program, via using the value of current authenticating count of the computer or the value obtained by deducting/adding a value of a preset count from/to the value of current authenticating count as factor and the dynamic password generating algorithm, in which the sequence of passwords is regarded as the verification window; and correspondingly, the verification window includes several random passwords in a category of valid authenticating count.

7. The method of claim 6, wherein the method further includes following steps after generating a sequence of passwords by the dynamic password computer startup protection program:

the dynamic password computer startup protection program adds 1 to the value of the current count;

a step after the dynamic password generating device receives the dynamic password generating command from the user, the dynamic password generating device generates the password according to a password generating factor which is the current authenticating count and a password generating algorithm includes the dynamic password generating device adds 1 to the value of current authenticating count.

8. The method of claim 1 or 2, wherein the method further includes following steps after determining, by the dynamic password computer startup protection program, whether the password is valid:

obtaining the value of current system time of the computer when the dynamic password computer startup protection program generates the verification window, and recording the value as a first time value;

obtaining the value of the factor of time corresponding to the value of the verification window which is matched with the password, and recording the value as a second time value; and calculating the different value between the first time value and the second time value, in which the different value is adapted to implement the time synchronization between the dynamic password computer startup protection program and the dynamic password generating device.

9. The method of claim 1 or 2, wherein the method further includes following steps after determining, by the dynamic password computer startup protection program, whether the password is valid;

obtaining the value of the current authenticating count of the computer system when the dynamic password computer startup protection program generates the verification window, and recording the value as a first count value;

obtaining the value of the factor of the authenticating count corresponding to the value of the verification window which is matched with the password, and recording the value as a second count value; and calculating the different value between the first count value and the second count value, in which the different value is adapted to implement the event synchronization between the dynamic password generating protecting program and the password generating device.

10. A method for computer startup protection, wherein the method includes:

writing a dynamic password computer startup protection program into master boot record of hard disk and reserving the information of division table;

powering up a computer;

loading and executing, by the computer, the dynamic password computer startup protection program;

receiving, by the dynamic password computer startup protection program, a password entered by a user; in which the password is obtained by the user via sending a dynamic password generating command to a dynamic password generating device; when the dynamic password generating device receives the dynamic password generating command from the user, the dynamic password generating device generates the password according to a password generating factor and a password generating algorithm, the password generating factor is current time or current authenticating count of the dynamic password generating device;

generating, by the dynamic password computer startup protection program, a series of authentication passwords using current time or current authenticating count of the system as a factor; and determining, by the dynamic password computer startup protection program, whether the password is valid through comparing the password entered by the user with the authentication passwords, if the password entered by the user equal to one of the authentication passwords, the dynamic password computer startup protection program loads a computer startup program of the computer; otherwise the dynamic password computer startup protection program does not load the computer startup program of the computer;

wherein determining, by the dynamic password computer startup protection program, whether the password is valid further includes receiving, by the dynamic password computer startup protection program, the user information which includes account information and PIN code of the user; and the step of determining, by the dynamic password computer startup protection program, whether the password is valid specifically includes after receiving the user information, obtaining, by the dynamic password computer startup protection program, a dynamic password generating algorithm corresponding to the user information according to the corresponding relationship between the user information prestored in the preset location of the hard disk and the identifier of the dynamic password generating device; and generating a verification window according to the obtained dynamic password generating algorithm, and determining whether the password is in the category of the verification window, if so, the password is valid, otherwise the password is not valid.

11. A method for computer startup protection, wherein the method includes writing a dynamic password computer startup protection program into master boot record of hard disk and reserving the information of division table;

loading and executing, by a computer, a dynamic password computer startup protection program;

transferring, by the computer, a control right of the computer to the dynamic password computer startup protection program;

generating challenge data randomly by the dynamic password computer startup protection program with algorithm stored in the dynamic password computer startup protection program;

outputting, by the dynamic password computer startup protection program, the challenge data to a user; entering, by the user, the challenge data into a dynamic password generating device;

generating a password by the dynamic password generating device according to the challenge data with a dynamic password generating algorithm stored in the dynamic password generating device; entering, by the user, the password into the dynamic password computer startup protection program;

receiving, by the dynamic password computer startup protection program, the password entered by the user;

generating authentication data according to the password by the dynamic password computer startup protection program;

comparing the authentication data to the challenge data by the dynamic password computer startup protection program; and determining, by the dynamic password computer startup protection program, whether the password is valid, according to the comparison; if so, a computer startup program is loaded; otherwise, the computer startup program is not loaded wherein the challenge data is a random number determining whether count of invalid verification by the user exceeds the threshold value, if so, the computer powers off automatically, otherwise the computer prompts the user to enter a password one more time in which the dynamic password generating device is not connected with the computer and information of the dynamic password generating device is stored in the computer, the using times of the dynamic password generating device is accord with the authenticating count of the computer;

wherein determining, by the dynamic password computer startup protection program, whether the password is valid further includes receiving, by the dynamic password computer startup protection program, the user information which includes account information and PIN code of the user; and the step of determining, by the dynamic password computer startup protection program, whether the password is valid specifically includes after receiving the user information, obtaining, by the dynamic password computer startup protection program, a dynamic password generating algorithm corresponding to the user information according to the corresponding relationship between the user information prestored in the preset location of the hard disk and the identifier of the dynamic password generating device; and generating a verification window according to the obtained dynamic password generating algorithm, and determining whether the password is in the category of the verification window, if so, the password is valid, otherwise the password is not valid.

12. The method of claim 11, wherein the dynamic password computer startup protection program is located in BIOS or master boot record, correspondingly, the method further includes writing the dynamic password computer startup protection program into a preset location of BIOS, if the dynamic password computer startup program is located in BIOS; and correspondingly, the method further includes writing the dynamic password computer startup protection program into the master boot record, and reserving the information of division table, if the dynamic password computer startup program is located in the master boot record.

13. The method of claim 12, wherein the step of loading and executing a dynamic password computer startup protection program includes if the dynamic password computer startup protection program is located in the master boot record, loading and executing the dynamic password computer startup protection program in the master boot record after successful BIOS self-checking.

14. The method of claim 12, wherein the step that the dynamic password computer startup protection program determines whether the password is valid includes obtaining, by the dynamic password computer startup protection program, an authentication password generating algorithm, which is stored in the preset location of the hard disk, corresponding to the dynamic password generating algorithm in the dynamic password generating device after the dynamic password computer startup protection program receives the password entered by the user; and generating, by the dynamic password computer startup protection program, authentication data according to the obtained authentication password generating algorithm and the challenge data; and determining whether the password is valid according to the authentication data.

15. The method of claim 11, wherein a step before receiving, by the dynamic password computer startup protection program, a password entered by a user includes prompting, by the dynamic password computer startup protection program, the user to enter a dynamic password, in which the specific way of prompting includes displaying a dialogue box or characters.

* * * * *